United States Patent
Ciocarlie et al.

(10) Patent No.: US 9,491,324 B2
(45) Date of Patent: Nov. 8, 2016

(54) PRINTER-POOL BASED SPLITTING OF MULTI-COPY PRINT JOBS

(71) Applicants: Mihai Ciocarlie, Timisoara (RO); Gheorghe Cornel Bot, Lugoj (RO)

(72) Inventors: Mihai Ciocarlie, Timisoara (RO); Gheorghe Cornel Bot, Lugoj (RO)

(73) Assignee: Ricoh Company, Ltd., Tokyo (JP)

( * ) Notice: Subject to any disclaimer, the term of this patent is extended or adjusted under 35 U.S.C. 154(b) by 7 days.

(21) Appl. No.: 14/187,866

(22) Filed: Feb. 24, 2014

(65) Prior Publication Data

US 2015/0244890 A1    Aug. 27, 2015

(51) Int. Cl.
*H04N 1/00* (2006.01)

(52) U.S. Cl.
CPC .......... *H04N 1/00954* (2013.01); *H04N 1/001* (2013.01); *H04N 2201/32* (2013.01)

(58) Field of Classification Search
CPC ............. H04N 1/00954; H04N 1/001; H04N 2201/32
USPC ........ 358/1.15, 1.13, 1.16; 147/1.15
See application file for complete search history.

(56) References Cited

U.S. PATENT DOCUMENTS

| | | | |
|---|---|---|---|
| 6,874,034 B1 * | 3/2005 | Hertling | .......... 709/245 |
| 7,304,760 B2 | 12/2007 | Ferlitsch | |
| 7,639,381 B2 | 12/2009 | Shima | |
| 7,884,962 B2 | 2/2011 | Motamed | |
| 7,936,472 B2 | 5/2011 | Ferlitsch | |
| 2001/0038760 A1 * | 11/2001 | Mori | ...... G06K 15/02 399/82 |
| 2002/0163665 A1 * | 11/2002 | Iwata et al. | ........ 358/1.15 |
| 2004/0158654 A1 * | 8/2004 | Shima | ............... 710/8 |
| 2004/0190042 A1 * | 9/2004 | Ferlitsch et al. | ....... 358/1.15 |
| 2005/0024672 A1 * | 2/2005 | Guster et al. | ......... 358/1.14 |
| 2006/0033956 A1 | 2/2006 | Takahashi | |
| 2006/0250638 A1 * | 11/2006 | Wang | ...... H04N 1/00236 358/1.15 |
| 2010/0033758 A1 | 2/2010 | Sakuraba | |
| 2011/0128584 A1 * | 6/2011 | Kuroshima | ......... 358/1.15 |

FOREIGN PATENT DOCUMENTS

| | | |
|---|---|---|
| JP | 2003228467 | 8/2003 |
| JP | 2004192064 | 7/2004 |

OTHER PUBLICATIONS

U.S. Appl. No. 13/847,602, to Gaertner et al., filed Mar. 20, 2013.

* cited by examiner

*Primary Examiner* — Kent Yip
(74) *Attorney, Agent, or Firm* — Duft Bornsen & Fettig LLP

(57) ABSTRACT

Systems and methods are provided for automatically splitting multi-copy print jobs across a printer pool represented by a virtual printer. The system includes a print server, and the print server includes an interface and a controller. The interface is able to present a pool of multiple printers as a virtual printer, and to receive a multi-copy print job directed to the virtual printer. The controller is able to identify printers from the pool that are available for printing the print job, to split the print job into multiple child jobs that each include a separate copy of print data for the print job, and to queue the child jobs at the available printers.

20 Claims, 10 Drawing Sheets

PRINTER-POOL BASED SPLITTING OF MULTI-COPY PRINT JOBS

FIELD OF THE INVENTION

The invention relates to the field of printing, and in particular, to print job processing for printers.

BACKGROUND

Print shops often include multiple printers (e.g., continuous-forms printers) which mark physical media such as paper in order to physically print one or more incoming print jobs. In many cases, the capabilities of individual printers within the print shop may vary. For example, one printer may be specially designed for color printing, while another printer may be designed for black and white printing. Because the capabilities of individual printers may vary, a print shop operator must carefully choose which printers to use to print incoming jobs. For example, it may be undesirable to use a 300 Dot Per Inch (DPI) monochrome printer to print a 1200 DPI color print job. This issue is only compounded when an operator seeks to use multiple printers in order to generate multiple copies of printed output for a job.

SUMMARY

Embodiments described herein represent a printer pool as a virtual printer, and automatically split multi-copy print jobs that are submitted to the printer pool. After a submitted multi-copy job has been split into multiple child jobs, the child jobs may be distributed to queues for the printers in the pool in order to enhance printing speed. This copy-split process also reduces the potential for operator error.

One embodiment is a system that includes a print server. The print server includes an interface and a controller. The interface is able to present a pool of multiple printers as a virtual printer, and to receive a multi-copy print job directed to the virtual printer. The controller is able to identify printers from the pool that are available for printing the print job, to split the print job into multiple child jobs that each include a separate copy of print data for the print job, and to queue the child jobs at the available printers.

Another embodiment is a method. The method includes presenting a pool of multiple printers as a virtual printer, receiving a multi-copy print job directed to the virtual printer, and identifying printers from the pool that are available for printing the print job. The method also includes splitting the print job into multiple child jobs that each include a separate copy of print data for the print job, and queuing the child jobs at the available printers.

Another embodiment is a non-transitory computer readable medium embodying programmed instructions which, when executed by a processor, are operable for performing a method. The method includes presenting a pool of multiple printers as a virtual printer, receiving a multi-copy print job directed to the virtual printer, and identifying printers from the pool that are available for printing the print job. The method also includes splitting the print job into multiple child jobs that each include a separate copy of print data for the print job, and queuing the child jobs at the available printers.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
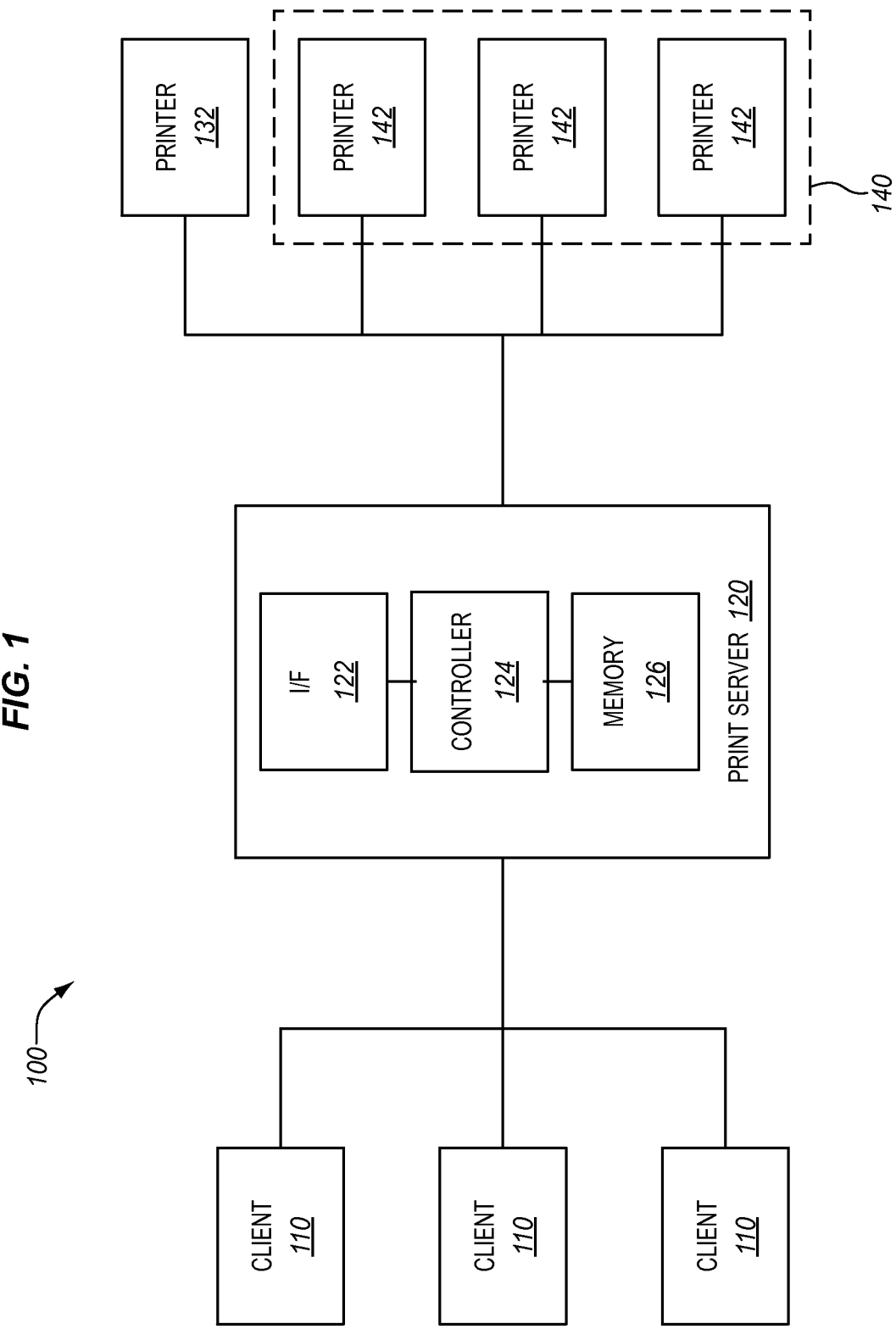
FIG. 1 is a block diagram of a print shop architecture in an exemplary embodiment.

FIG. 1 is a block diagram of a print shop architecture 100 in an exemplary embodiment. Print shop architecture 100 receives incoming print jobs from one or more customers, processes the print data for these received jobs, and generates printed output. For example, print shop architecture 100 may be utilized to print books, magazines, credit card statements, etc. Print shop architecture 100 has been enhanced to group printers into pools, and to present each printer pool as a virtual printer. Print shop architecture 100 splits multi-copy print jobs that are received at a virtual printer for a printer pool. Specifically, a multi-copy print job is split into child jobs that each request a subset of the total number of requested copies, and the child jobs may be distributed across the printers in the pool. This means that the copies for an incoming job can be printed quickly and efficiently across multiple printers at once.

In this embodiment, print shop architecture 100 includes one or more clients 110, which provide jobs to print server 120 for processing. Clients 110 may comprise any combination of devices and/or systems that are capable of submitting a print job to print server 120. For example, clients 110 may comprise client applications that operate on remote computers and transmit jobs to print server 120 via the Internet.

Print server 120 receives incoming print jobs from clients 110, processes the print data for the jobs, and forwards processed print data onwards to one or more printers (e.g., 132, 142) for printing. Print server 120 also defines one or more groups of printers known as "printer pools." For example, as shown in FIG. 1, printer pool 140 comprises three separate printers 142. Print server 120 represents each of its printer pools as a single virtual printer. Thus, any of clients 110 seeking to submit a print job to print server 120 views the printer pool as a single virtual printer, instead of a group of individual printers.

In this embodiment, print server 120 comprises interface 122, controller 124, and memory 126. Interface 122 comprises any component or device operable to receive print data from one or more clients 110. For example, interface 122 may include one or more network ports, and each port of interface 122 may correspond with a specific virtual printer defined by print server 120.

In another embodiment, clients 110 may use a web submission tool to send print jobs to interface 122. For example, the web submission tool may comprise an Internet application for selecting a virtual printer via, and submitting print data (e.g., a Portable Document Format (PDF) file), along with job ticket instructions, to a web server. The web server may then contact a service which utilizes a socket-based Internet Protocol to communicate with interface 122 of print server 120.

In another embodiment, the Line Printer Daemon (LPD) protocol may be used by clients 110 to submit a job, in which case communications are received at print server 120 over a single port, and the name of a selected virtual printer is indicated in commands sent by the client. In yet another example, a hot folder is associated with each of the virtual printers on print server 120. A client device may then copy documents to the hot folder for the appropriate virtual printer. Print server 120 may then retrieve the documents from the hot folder, and create print jobs as desired.

Controller 124 manages the operations of print server 120 (e.g., by defining printer pools, processing print jobs, etc.). Controller 124 may be implemented as custom circuitry, as a processor executing programmed instructions, etc. Memory 126 stores data used by print server 120 to facilitate the processing of incoming print jobs. For example, memory 126 may store a copy of the print data for the incoming print jobs, may store definitions for one or more printer pools and/or virtual printers, etc.

Printers 132 and/or 142 receive print data from print server 120, and generate printed output as instructed by the print data. Printers 132 and/or 142 comprise any systems, devices, or components operable to mark print media (e.g., paper). For example, printers 132 and/or 142 may dispense ink or toner onto the print media.

The print shop architecture of FIG. 1 has been enhanced to allow print server 120 to represent entire printer pools as single virtual printers. In this manner, a user seeking to submit a multi-copy print job to print shop architecture 100 may submit the job to the virtual printer, and may then rely on print server 120 to distribute the copies of the print job across the physical/actual printers of the pool to increase overall printing speed.

The particular arrangement, number, and configuration of components described herein is exemplary and non-limiting. Illustrative details of the operation of print shop architecture 100 will be discussed with regard to FIG. 2. Assume, for this embodiment, that a customer has completed crafting a print job, and desires to submit the job to a print shop in order to generate multiple printed copies of the job. The customer operates client 110, selects a virtual printer at print server 120, and initiates transmission of the print job from client 110 to print server 120.

Figure 2:
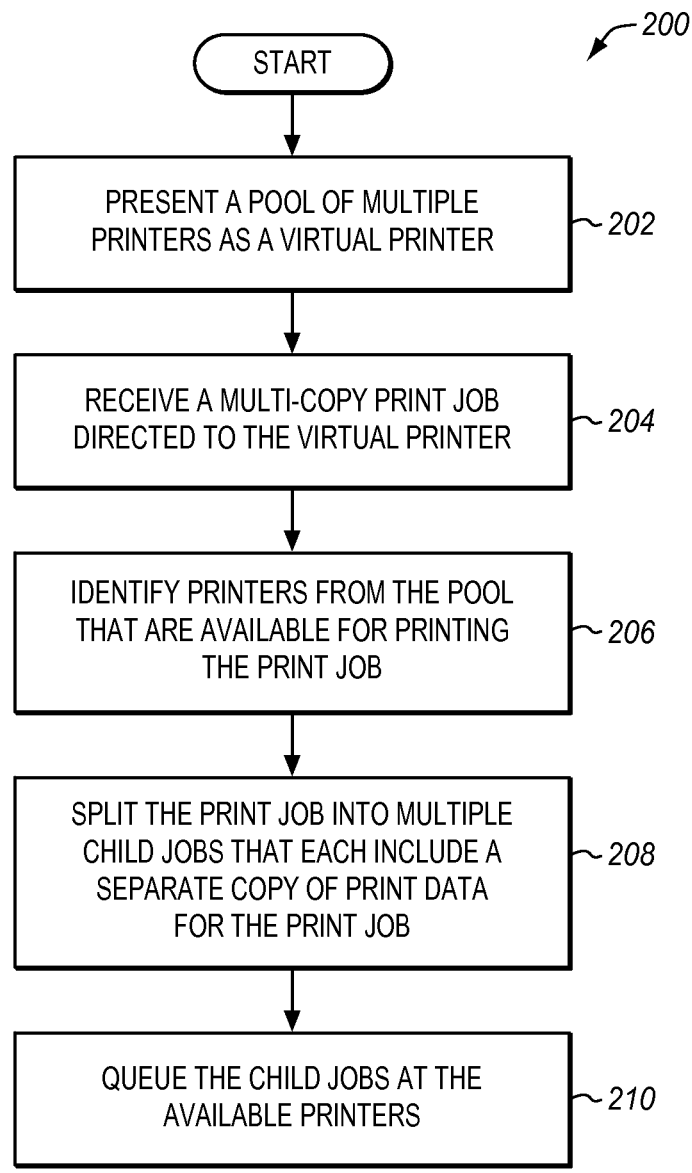
FIG. 2 is a flowchart illustrating a method for operating a print shop architecture in an exemplary embodiment.

FIG. 2 is a flowchart illustrating a method 200 for operating a print shop architecture in an exemplary embodiment. The steps of method 200 are described with reference to print shop architecture 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, interface 122 presents a pool of multiple physical printers as a virtual printer. Thus, the pool is treated by clients 110 as a single physical printer, even though the virtual printer represents an entire group of physical printers. In one embodiment, interface 122 presents each virtual printer as a separate Internet Protocol (IP) port. To client 110, each port appears to represent a single physical printer. In this manner, when a user desires to print via an entire pool of printers, there is no need for the user to manually split the print job. Instead, the user may select the virtual printer for the printer pool, and allow print server 120 to determine how to distribute copies of the print job among the printers of the pool.

In step 204, interface 122 receives a multi-copy print job directed to the virtual printer. In one embodiment, the print job may comprise Portable Document Format (PDF) print data, as well as a Job Definition Format (JDF) job ticket. The job ticket may request a number of copies for the print job/data, a type and orientation of print media, a preferred amount of DPI for the print job, etc.

Because the virtual printer represents a printer pool, controller 124 determines that the print job is directed to multiple printers at once. Therefore, in step 206, controller 124 identifies which printers from the pool are available for printing the received job. In one embodiment, controller 124 compares settings for the print job to capabilities of each printer in the pool in order to determine which printers are capable of handling the print job.

In step 208, controller 124 splits the print job into multiple child jobs. Splitting the print job into child jobs may comprise generating multiple new independent child jobs. For example, each child job may be created with a copy of print data from the original print job, as well as a modified job ticket that requests a smaller number of copies than the total number of copies requested for the originally received job.

Controller 124 may distribute the child jobs across any suitable number of printers in the pool that are available for printing the child jobs. Furthermore, controller 124 may decide a number of copies to send to each of the available printers based on the speed and queue size of the printers. For example, controller 124 may compare an estimated completion time for a single copy against a completion time for multiple copies at a single printer, and these completion times may also be compared to those of other printers. Based on such information, the child jobs may be distributed across the printers of pool 140 in order to optimize an expected completion time for the group of child jobs.

In step 210, controller 124 queues the child jobs at the available printers (e.g., by queuing one child job at each available printer). Each child job requests at least one copy, and the sum of the requested copies for the child jobs equals the number of copies originally indicated by the print job received in step 202. By adding the child jobs to the existing queues for the printers, the child jobs are sent out for printing without disrupting other printing operations at print server 120.

Using method 200, an entire printer pool may be represented by a single virtual printer on print server 120. This means that a print shop operator need not spend time fine-tuning how they will distribute a multi-copy print job across various printers. Instead, the operator may rely upon print server 120 to decide how to distribute the copies across available printers within a given printer pool. Since a print shop operator often has many more duties than just print job scheduling (e.g., cutting, stacking, stapling, loading print media, etc.), the print shop operator saves a great deal of time. Method 200 also reduces the potential for human error when distributing a print job across multiple printers.

In a further embodiment, controller 124 re-orders child jobs within individual printer queues, or moves the child jobs to different queues (e.g., based on input from the print shop operator). Moving the child jobs between queues provides a benefit when, for example, a printer in the pool changes its status from offline to online, or vice versa.

In an additional embodiment, when each child job reaches the front of a queue for its corresponding printer, controller 124 translates the child job from Portable Document Format (PDF) data into PostScript data which is then transmitted to the printer.

In another embodiment, controller 124 refrains from splitting a received print job into child jobs unless the received print job requests more than a threshold number of copies or pages (e.g., as defined by a user via a printer pool object or virtual printer). Such a process may be desirable when there is little or no time benefit to splitting the job across the entire printer pool.

In a still further embodiment, controller 124 receives progress reports from the individual printers that are printing the child jobs. The progress reports may indicate a number of pages of the child job that have been printed by the printer, a number of copies printed by the printer, etc. Controller 124 may further aggregate this information in order to determine an overall progress report for the originally received print job.

EXAMPLES

In the following examples, additional processes, systems, and methods are described in the context of a print shop architecture that distributes multi-copy print jobs across a printer pool. Assume, for this example, that a print server manages four printers, and has defined two printer pools for the printers.

Figure 3:
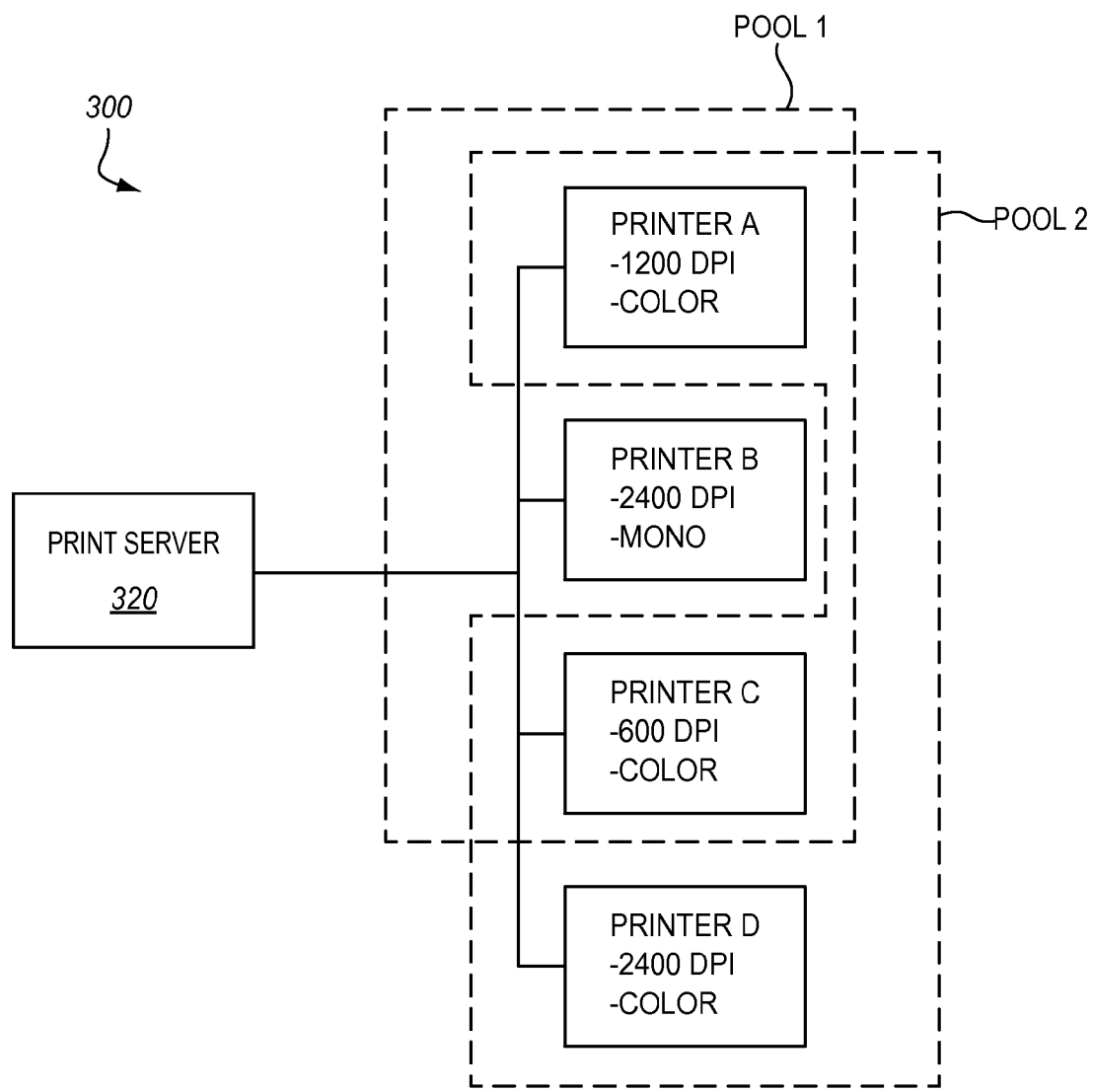
FIG. 3 is a block diagram illustrating multiple printer pools in an exemplary embodiment.

FIG. 3 is a block diagram 300 illustrating printer pools in an exemplary embodiment. According to FIG. 3, print server 320 manages printers A, B, C, and D. Each of the printers has a different set of capabilities. Furthermore, each of the printers is included within one or more printer pools. As shown in FIG. 3, Pool 1 includes printers A, B, and C, while Pool 2 includes printers A, C, and D.

Print server 320 stores one or more virtual printers that represent a printer pool, and print server 320 also stores printer objects that indicate the capabilities of each printer. These pieces of information are correlated/linked as described below with regard to FIG. 4.

Figure 4:
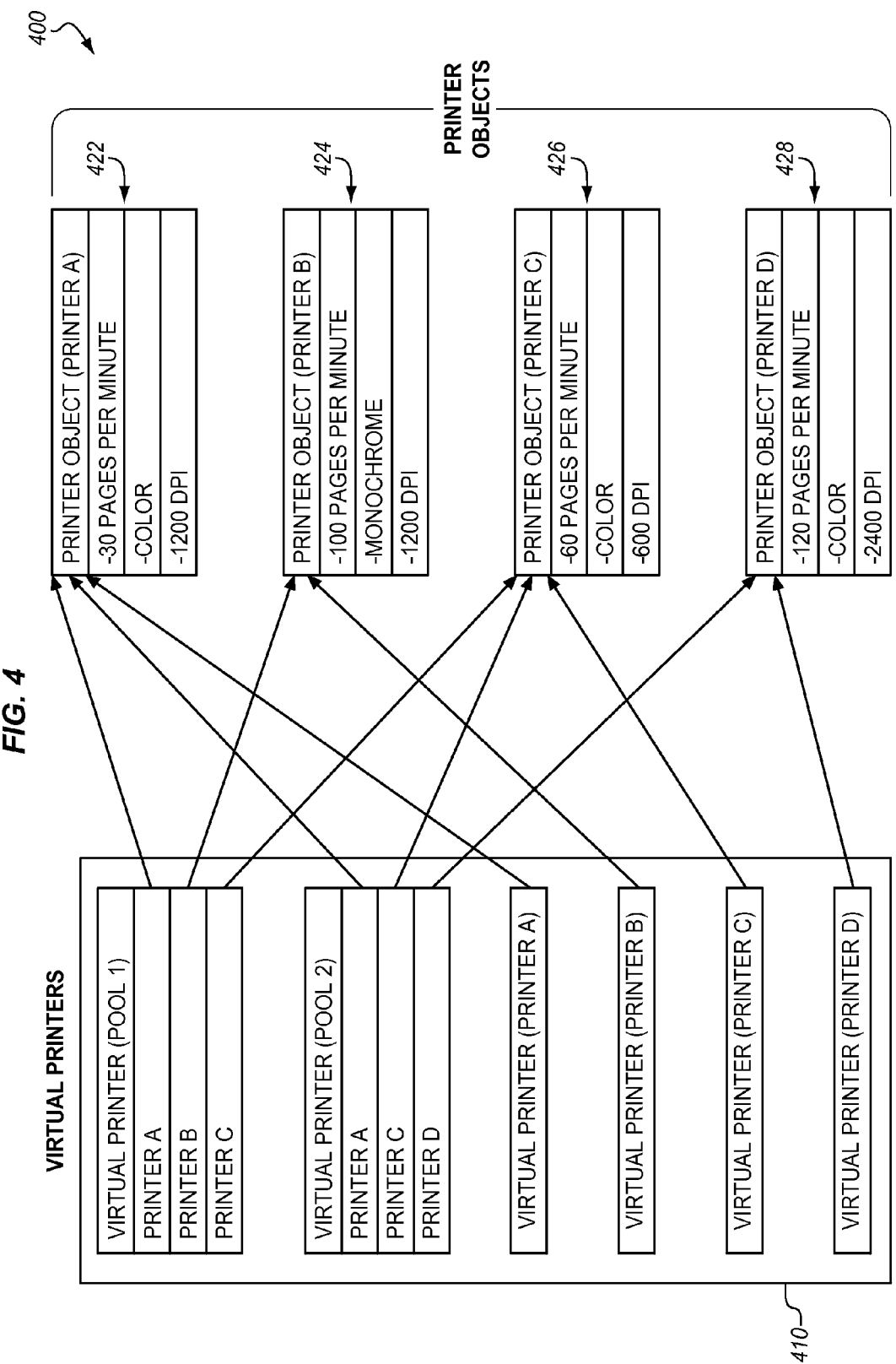
FIG. 4 is a block diagram illustrating links between virtual printers and printer objects in an exemplary embodiment.

FIG. 4 is a block diagram 400 illustrating links between virtual printers and printer objects in an exemplary embodiment. Specifically, FIG. 4 illustrates printer information stored within a memory of print server 320.

Some of the information in memory describes one or more virtual printers 410. The virtual printers are visible to clients of print server 320, and as shown in FIG. 4, the virtual printers for Pool 1 and Pool 2 each correspond with multiple physical printers. Other information in memory describes one or more printer objects. Printer objects indicate the capabilities and/or contact information for a given physical printer within the print shop. For example, object 422 represents the capabilities of printer A, object 424 represents the capabilities of printer B, object 426 represents the capabilities of printer C, and object 428 represents the capabilities of printer D. Other capabilities may also be described by the print object, including whether a physical printer is punch capable or staple cable, what type of media is present in the input trays for a physical printer, etc.

Within FIG. 4, each virtual printer is linked in memory with one or more printer objects. For example, each virtual printer may include one or more pointers to individual printer objects, and may reference printer objects by name, memory address, etc.

Figure 5:
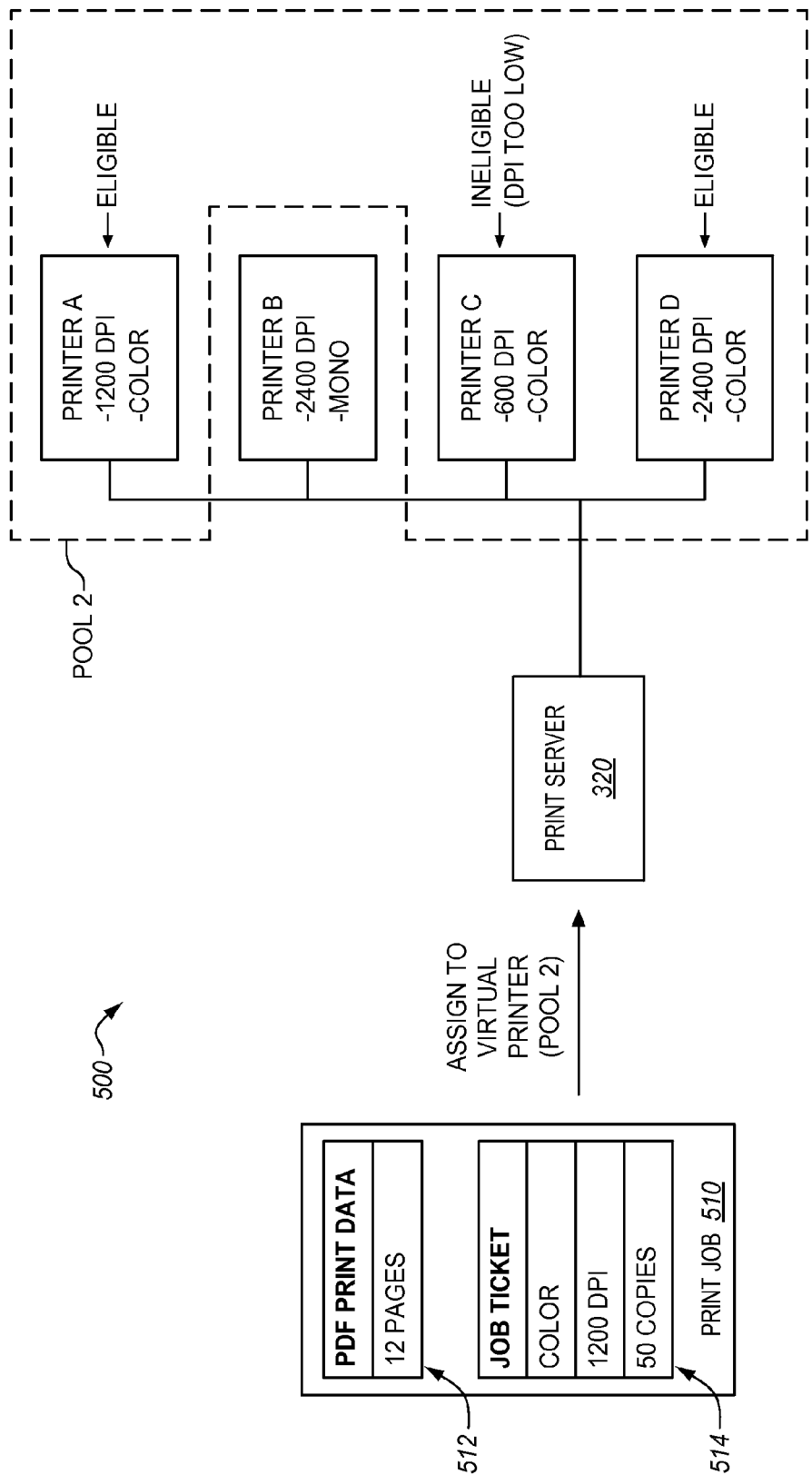
FIG. 5 is a block diagram illustrating a print job sent to a printer pool in an exemplary embodiment.

Assume, for this example, that a client transmits a print job to print server 320, and that the print job is transmitted to the virtual printer for Pool 2. FIG. 5 is a block diagram 500 illustrating a print job 510 sent to the virtual printer for printer Pool 2 in an exemplary embodiment. Print job 510 includes Portable Document Format (PDF) print data 512, as well as a Job Definition Format (JDF) job ticket 514. Job ticket 514 indicates that fifty copies of print data 512 should be printed, and further indicates that print data 512 should be printed in color at 1200 DPI. Based on this information, a controller of print server 320 determines that printers A and D are available/eligible to print the job, while printer C is not. Thus, the controller of print server 320 decides to generate two child jobs (one for each available printer).

Figure 6:
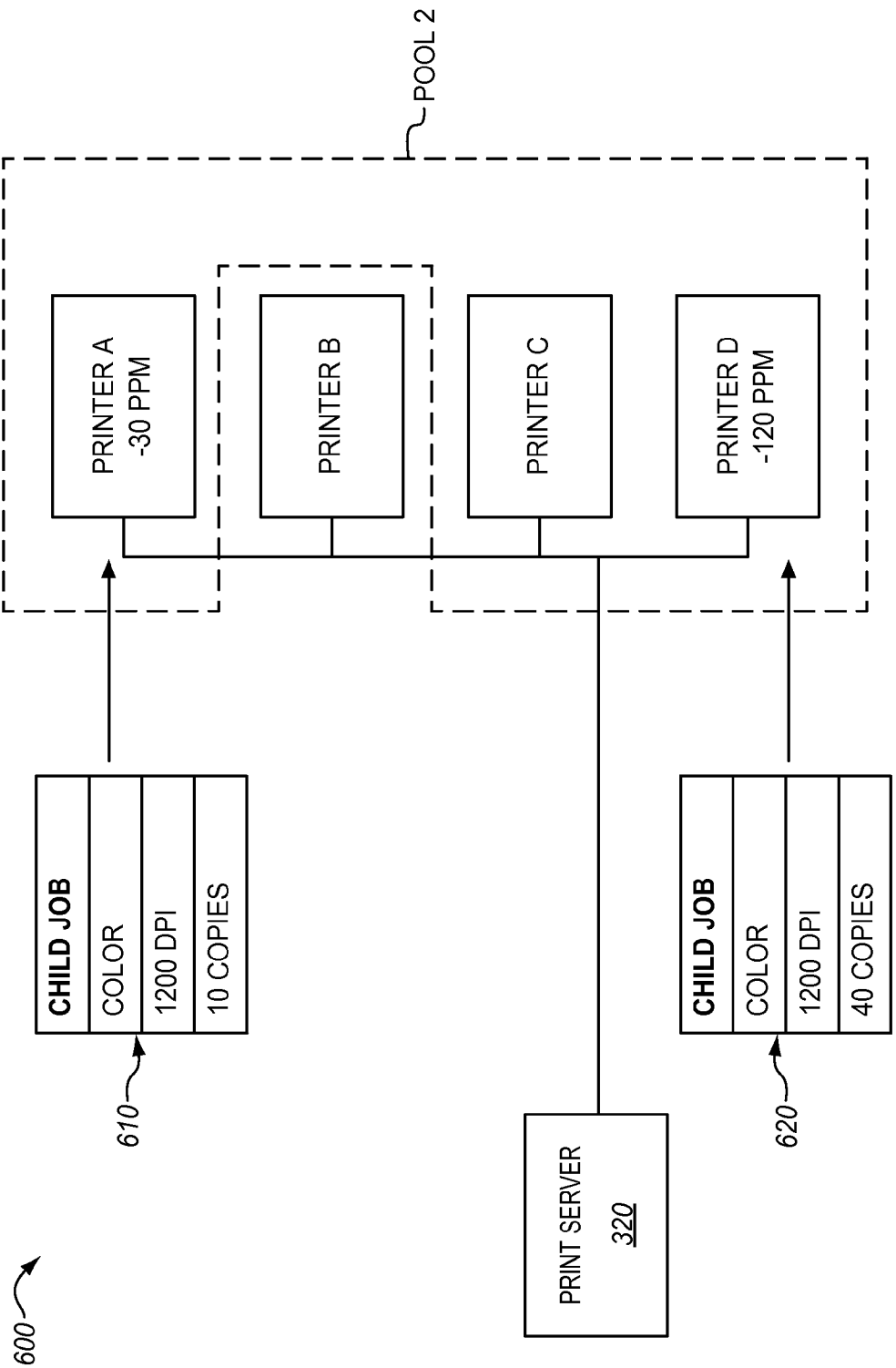
FIG. 6 is a block diagram illustrating child jobs sent to individual printers of a printer pool in an exemplary embodiment.

FIG. 6 is a block diagram 600 illustrating child jobs 610 and 620, which are sent to individual printers of printer Pool 2 in an exemplary embodiment. In this example, the controller of print server 320 reviews the printer object for each available printer (A, D) to determine a printing speed of each printer. The controller further reviews a queue stored at print server 320 for each available printer. In this example, the queues are empty, and the printing speeds of the printers are different. Because printer D has four times the speed of printer A, the controller assigns four times the number of copies to printer D than to printer A.

Figure 7:
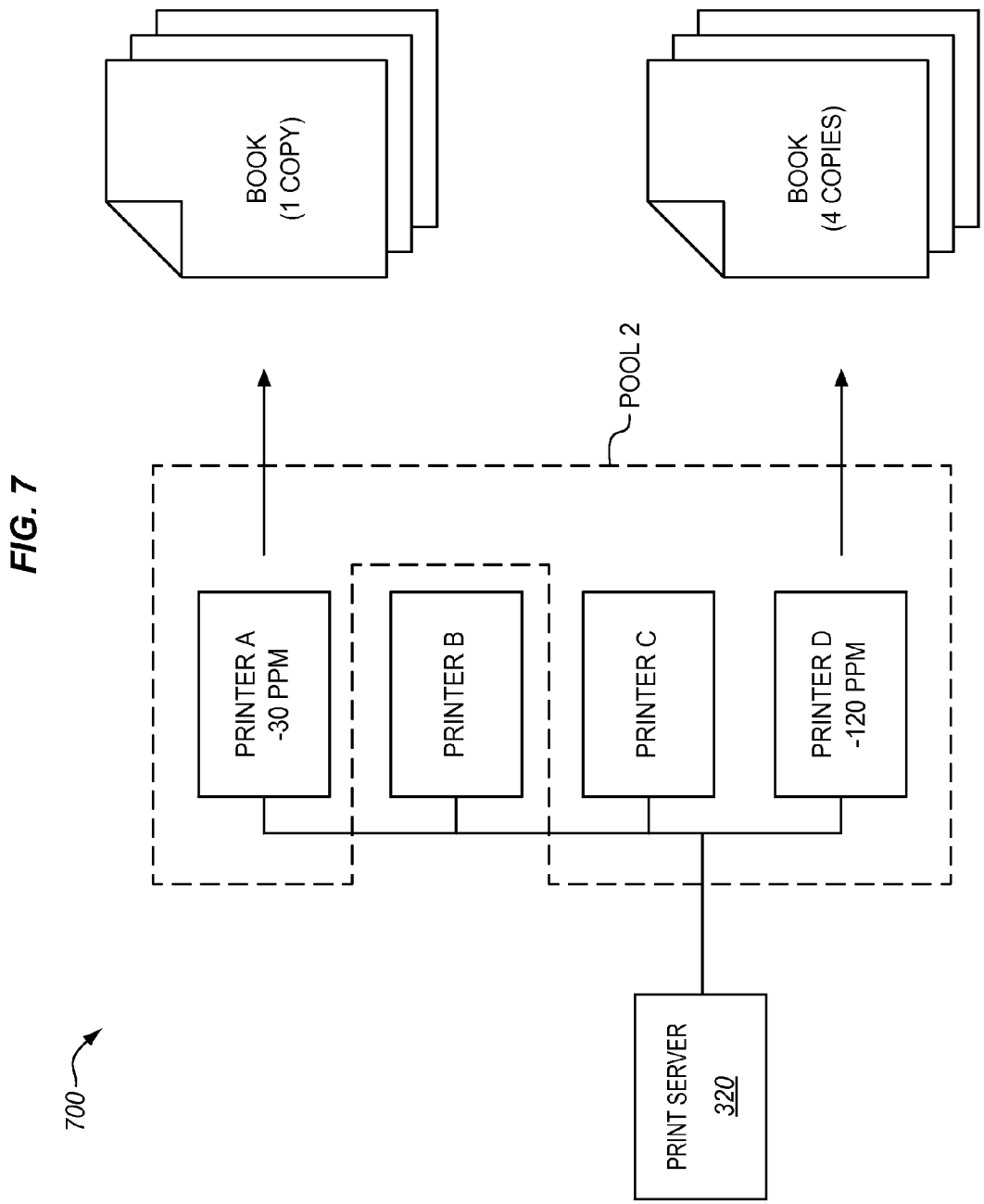
FIG. 7 is a block diagram illustrating printed output from a printer pool in an exemplary embodiment.

Once the child jobs have been sent to printers A and D, printing initiates at each of these printers. FIG. 7 is a block diagram 700 illustrating printed output from a printer pool in an exemplary embodiment. FIG. 7 illustrates for context how the volume of printed output varies between printer A and printer D.

In this example, printers A and D each periodically report their current printing progress to print server 320 (e.g., after each page is completed, after each copy is completed, once each minute, etc.). This progress information indicates the status of the individual child jobs, which enables print server 320 to determine the overall progress of the originally received print job as a whole.

Figure 8:
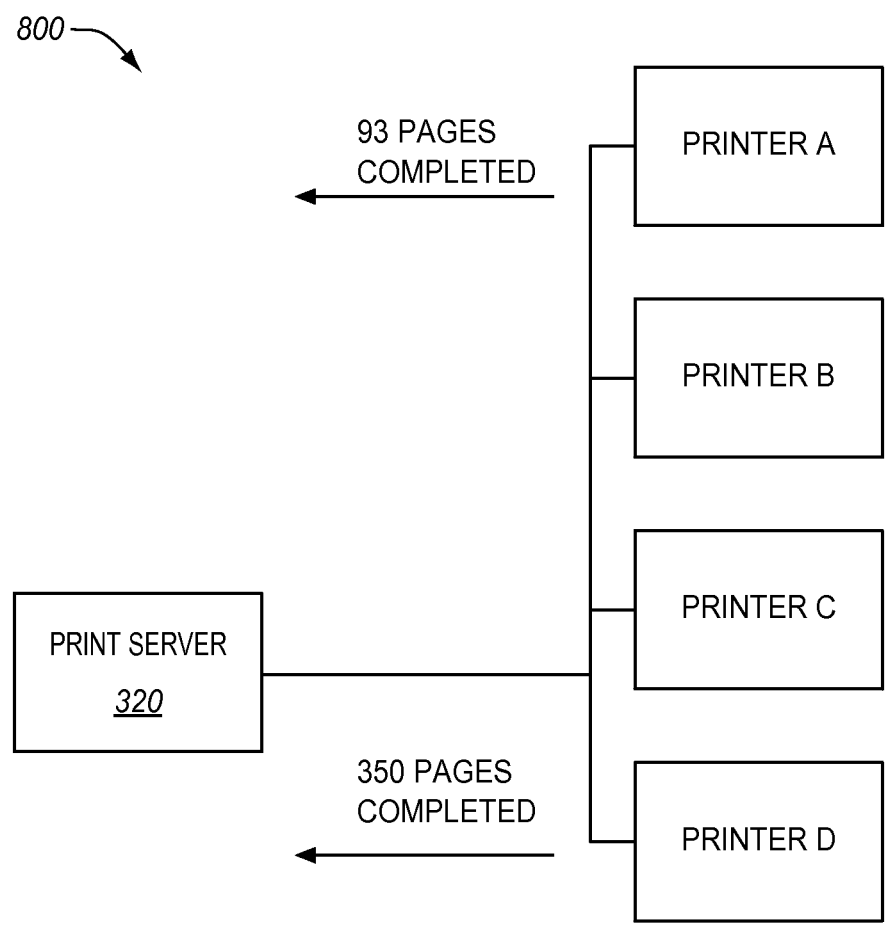
FIG. 8 is a block diagram illustrating progress information sent from individual printers of a printer pool to a print server in an exemplary embodiment.

FIG. 8 is a block diagram 800 illustrating progress information sent from the printers to print server 320 in an exemplary embodiment. In FIG. 8, the progress information indicates a number of completed pages. However, any suitable metrics may be provided (e.g., a number of completed copies, any detected errors, etc.). Based on the progress information provided by printers A and D, print server 320 generates a progress report and transmits the report to the client that submitted the job. In this example, print server 320 infers a number of copies that have been printed, based on the number of pages that have been printed at each printer. A user interface of the client then provides the progress report to a customer or print shop operator.

Figure 9:
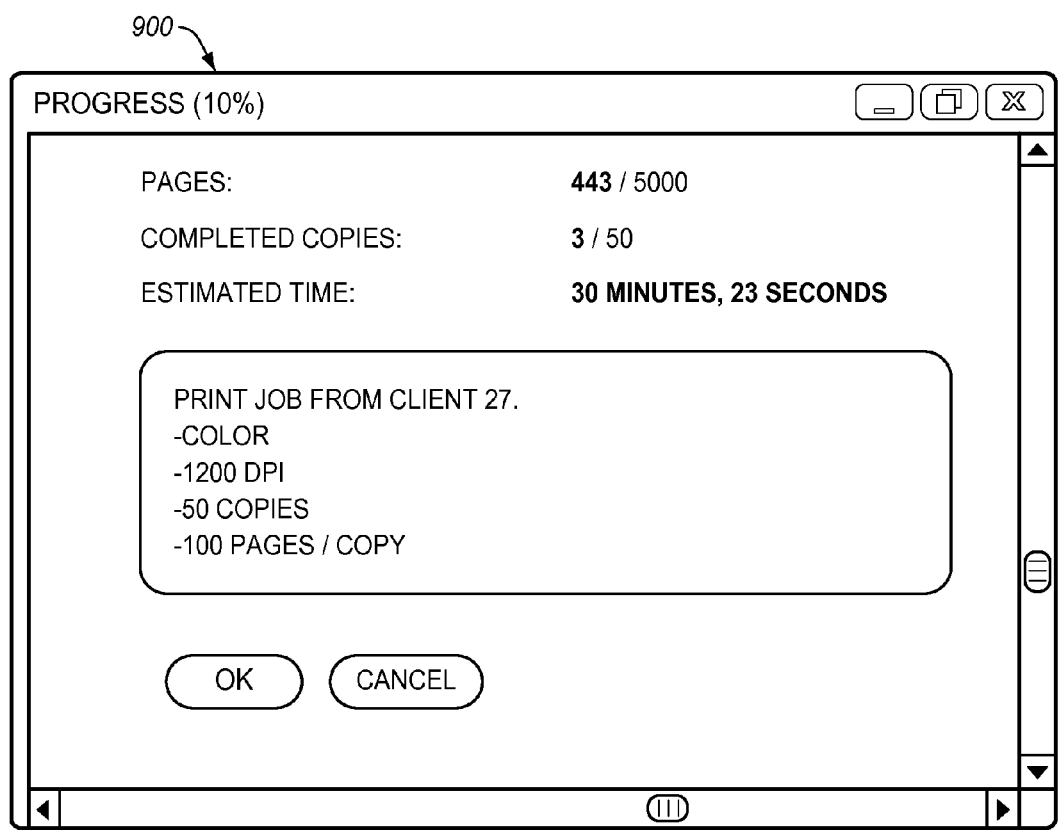
FIG. 9 is an illustration of a user interface in an exemplary embodiment.

FIG. 9 is an illustration of a user interface 900 in an exemplary embodiment. According to FIG. 9, the progress report shown at user interface 900 describes how close the print job originally submitted to print server 320 is to completion. This information is aggregated based on the status reports for the child jobs. Based on the printing speed of each of the printers (as well as the current queue size for each printer), the progress report further indicates an estimated completion time for the overall job.

Figure 10:
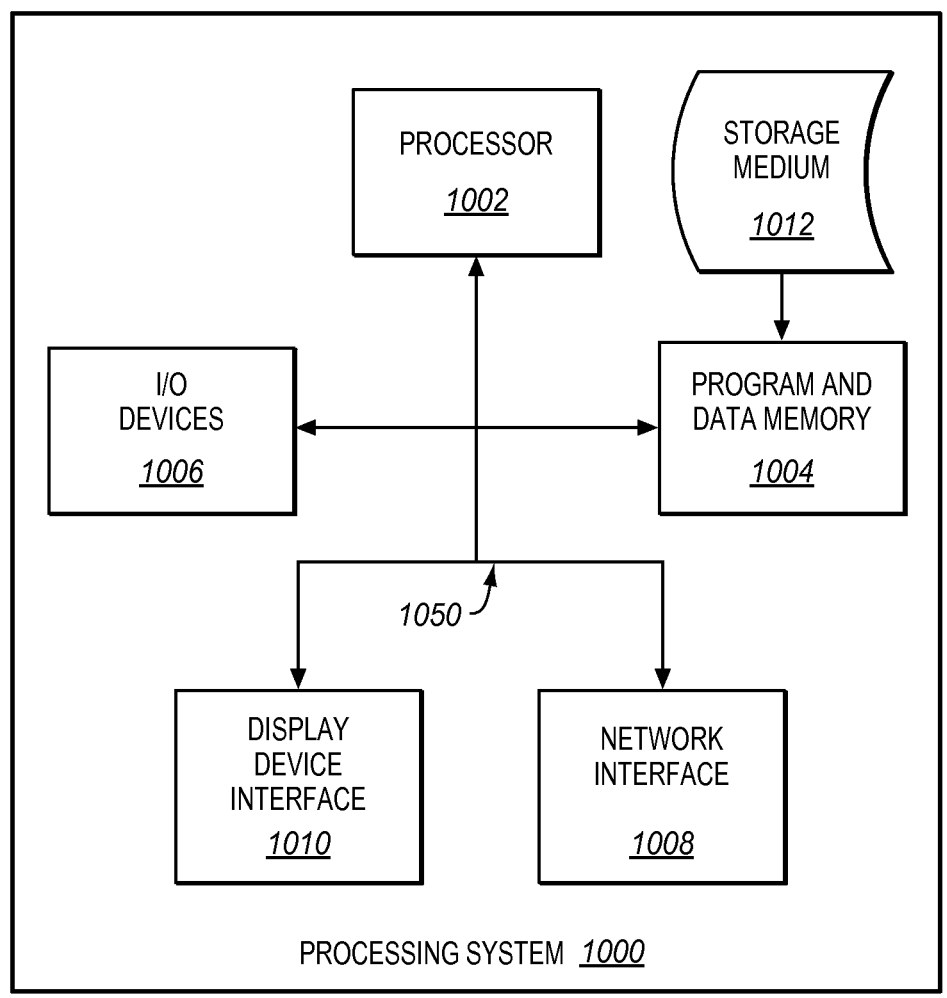
FIG. 10 illustrates a processing system configured to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 120 to perform the various operations disclosed herein. FIG. 10 illustrates a processing system 1000 operable to execute a computer readable medium embodying programmed instructions to perform desired functions in an exemplary embodiment. Processing system 1000 is operable to perform the above operations by executing programmed instructions tangibly embodied on computer readable storage medium 1012. In this regard, embodiments of the invention can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 may be integrated with the system to interface to one or more display devices, such as printing systems and screens for presentation of data generated by processor 1002.

Although specific embodiments were described herein, the scope of the invention is not limited to those specific embodiments. The scope of the invention is defined by the following claims and any equivalents thereof.

We claim:

1. An apparatus comprising:
    a print server comprising:
        an interface configured to present a pool of multiple printers as a virtual printer represented by a single network port, and to receive a multi-copy print job directed to the virtual printer, wherein the print job comprises print data defining marks to apply onto a number of pages, and the print job further comprises a job ticket that is distinct from the print data and that defines a number of copies of the print data to print; and
        a controller configured to identify printers from the pool that are available for printing the print job, to split the print job into multiple child jobs that each include a separate copy of the print data, and to queue the child jobs at the available printers,
        wherein the controller is configured to identify a user-defined threshold number of copies, to split the print job into the child jobs in response to determining that the number of copies defined in the job ticket is greater than the threshold number, and to assign the print job to a single available printer without splitting the print job in response to determining that the number of copies defined in the job ticket is less than the threshold number.

2. The apparatus of claim 1, wherein the print server further comprises:
    a memory that stores multiple printer objects that each describe capabilities of a corresponding printer in the pool;
    wherein the controller is configured to follow links from the virtual printer to the multiple printer objects in order to identify capabilities of each of the printers in the pool.

3. The apparatus of claim 1, wherein:
    each child job is created with a copy of the print data from the print job, as well as a modified job ticket that requests an amount of copies smaller than the number of copies requested for the print job, and the amounts of copies for all of the child jobs sum to equal the number of copies for the print job,
    and the controller is configured to determine an amount of copies for a child job based on a speed and a current queue size of a printer at which the child job is queued.

4. The apparatus of claim 1, wherein:
    each child job comprises Portable Document Format (PDF) print data accompanied by a Job Definition Format (JDF) job ticket.

5. The apparatus of claim 4, wherein:
    the controller is configured to translate each child job from the PDF print data into PostScript print data in response to the child job reaching the front of its corresponding queue.

6. The apparatus of claim 1, wherein:
    the controller is configured to adjust a position of a child job within its corresponding queue.

7. The apparatus of claim 1, wherein:
    the controller is configured to move a child job between queues.

8. The apparatus of claim 1, wherein:
    the controller is configured to track each of the child jobs during printing, and to indicate an overall progress of the print job as the child jobs are printing based on a number of pages printed for each child job.

9. The apparatus of claim 1, wherein:
the threshold number is greater than one.

10. A method comprising:
presenting a pool of multiple printers as a virtual printer represented by a single network port at a print server;
receiving a multi-copy print job directed to the virtual printer, wherein the print job comprises print data defining marks to apply onto a number of pages, and the print job further comprises a job ticket that is distinct from the print data and that defines a number of copies of the print data to print;
identifying printers from the pool that are available for printing the print job;
identifying a user-defined threshold number of copies;
in response to determining that the number of copies defined in the job ticket is greater than the threshold number, splitting the print job into multiple child jobs that each include a separate copy of the print data, and queuing the child jobs at the available printers; and
in response to determining that the number of copies defined in the job ticket is less than the threshold number, assigning the print job to a single available printer without splitting the print job.

11. The method of claim 10, further comprising:
storing multiple printer objects that each describe capabilities of a corresponding printer in the pool; and
following links from the virtual printer to the multiple printer objects in order to identify capabilities of each of the printers in the pool.

12. The method of claim 10, wherein:
each child job is created with a copy of the print data from the print job, as well as a modified job ticket that requests an amount of copies smaller than the number of copies requested for the print job, and the amounts of copies for all of the child jobs sum to equal the number of copies for the print job, and the method further comprises:
determining an amount of copies for a child job based on a speed and a current queue size of a printer at which the child job is queued.

13. The method of claim 10, wherein:
each child job comprises Portable Document Format (PDF) print data accompanied by a Job Definition Format (JDF) job ticket.

14. The method of claim 13, further comprising:
translating each child job from the PDF print data into PostScript print data in response to the child job reaching the front of its corresponding queue.

15. The method of claim 10, further comprising:
adjusting a position of a child job within its corresponding queue.

16. The method of claim 10, further comprising:
moving a child job between queues.

17. The method of claim 10, further comprising:
tracking each of the child jobs during printing; and
indicating an overall progress of the print job as the child jobs are printing based on a number of pages printed for each child job.

18. The method of claim 10, wherein:
the threshold number is greater than one.

19. A non-transitory computer readable medium embodying programmed instructions which, when executed by a processor, are operable for performing a method comprising:
presenting a pool of multiple printers as a virtual printer represented by a single network port at a print server;
receiving a multi-copy print job directed to the virtual printer, wherein the print job comprises print data defining marks to apply onto a number of pages, and the print job further comprises a job ticket that is distinct from the print data and that defines a number of copies of the print data to print;
identifying printers from the pool that are available for printing the print job;
identifying a user-defined threshold number of copies;
in response to determining that the number of copies defined in the job ticket is greater than the threshold number, splitting the print job into multiple child jobs that each include a separate copy of the print data, and queuing the child jobs at the available printers; and
in response to determining that the number of copies defined in the job ticket is less than the threshold number, assigning the print job to a single available printer without splitting the print job.

20. The medium of claim 19, wherein the method further comprises:
storing multiple printer objects that each describe capabilities of a corresponding printer in the pool; and
following links from the virtual printer to the multiple printer objects in order to identify capabilities of each of the printers in the pool.

* * * * *